(12) United States Patent
Lee et al.

(10) Patent No.: US 6,421,326 B1
(45) Date of Patent: Jul. 16, 2002

(54) WIRELESS COMMUNICATIONS SYSTEM AND METHOD

(75) Inventors: Chih-Ping Lee, Cupertino; Nan-Sheng Lin, Fremont, both of CA (US)

(73) Assignee: Innomedia PTE LTD, Singapore (SG)

( * ) Notice: Subject to any disclaimer, the term of this patent is extended or adjusted under 35 U.S.C. 154(b) by 0 days.

(21) Appl. No.: 09/122,621

(22) Filed: Jul. 23, 1998

Related U.S. Application Data
(60) Provisional application No. 60/053,646, filed on Jul. 24, 1997.

(51) Int. Cl.[7] ................................................. H04B 3/20
(52) U.S. Cl. ...................... 370/286; 370/289; 370/292
(58) Field of Search ............................... 370/286, 328, 370/352, 507, 289, 278, 292, 345, 516; 455/570; 379/410

(56) References Cited

U.S. PATENT DOCUMENTS

| | | | |
|---|---|---|---|
| 4,724,435 A | * 2/1988 | Moses et al. | ................ 370/352 |
| 4,807,259 A | * 2/1989 | Yamanaka et al. | .......... 370/507 |
| 5,010,553 A | 4/1991 | Scheller et al. | ................ 371/35 |
| 5,280,473 A | * 1/1994 | Rushing et al. | ............. 370/516 |
| 5,353,348 A | * 10/1994 | Sendyk et al. | .............. 379/410 |
| 5,375,122 A | * 12/1994 | Soupirot et al. | ............ 370/345 |
| 5,796,731 A | * 8/1998 | Mellado et al. | ............. 370/286 |
| 5,911,124 A | * 6/1999 | Doran | ......................... 455/570 |

FOREIGN PATENT DOCUMENTS

| | | |
|---|---|---|
| EP | 0 394 051 A | 10/1990 |
| EP | 0 766 412 A | 4/1997 |
| FR | 2 728 123 A | 6/1996 |

OTHER PUBLICATIONS

Forney G.D., Jr., "The V.34 High–Speed Modem Standard," IEEE Communications Magazine, vol. 34, No. 12, Dec. 1996, pp. 28–33.

* cited by examiner

*Primary Examiner*—Salvatore Cangialosi
(74) *Attorney, Agent, or Firm*—McCutchen, Doyle, Brown & Enersen, LLP (57) ABSTRACT

A system and method enable wireless communication from one data processing system to a telephone network. The system and method establish a connection from a local transceiver to a base transceiver using echo cancellation techniques to remove various tones and noise. The system and method enable full duplex communication between the local transceiver and the base transceiver by using forward error correction algorithms to encode and decode messages therebetween, and by using an interleaving algorithm to protect against burst type errors.

28 Claims, 8 Drawing Sheets

WIRELESS COMMUNICATIONS SYSTEM AND METHOD

PRIORITY REFERENCE TO PRIOR APPLICATION

This application claims benefit of and incorporates by reference provisional application serial No. 60/053,646, entitled "Wireless Communications System and Method," filed on Jul. 24, 1997, by inventor Nan-Sheng Lin.

FIELD OF THE INVENTION

The invention relates to wireless communications systems, and more particularly relates to wireless communications systems for providing remote wireless access to computer networks.

BACKGROUND OF THE INVENTION

The personal computer has become ubiquitous as a business tool, and the rapid increase in popularity of the laptop or notebook computer has accelerated this phenomenon. The laptop personal computer has now achieved sufficient performance that users frequently rely on their laptops as their sole personal computer.

At the same time, the ever-expanding need for access to larger and larger stores of data has made the availability of networks, including LAN's, WAN's, the Internet, the World-Wide Web, and other large databases equally important to the future of computing. However, in contrast to the freedom offered by laptops, access to such large stores of information typically requires a wired connection to a local area network or to the Public Switched Telephone Network (PSTN). Thus, while laptops offer significantly greater freedom in permitting the user to choose where and when to work, the coexisting requirement of a wired connection limits that freedom.

Some products have been offered which attempt to resolve this dilemma. The most common such product is a modem capable of connecting through a conventional cellular telephone. The difficulty with such products is the slow data rate achievable by such products. While the concept is attractive, high speed wireless communications compliant with the v.34 standard, or communications at speeds on the order of 28.8 Kbps or 33.6 Kbps, requires a virtually noise-free communications signal with substantially no data loss, and this performance level has not been achievable in the existing commercially available products.

In addition, there have been specialty devices which integrate cellular or other wireless connections into modems. While these devices offer the advantage of higher levels of integration, they suffer from essentially the same performance limitations as modem/cell phone combinations.

Moreover, such conventional devices do not address an increasingly significant need of the home/small business computer user market. Many such computer users, and especially users of laptops in these environments, prefer to work at various locations within their home or office even though phone connections may only be available in one of those locations. With conventional systems, the user is required to disconnect from the public switched telephone network to be able to operate at their desired location. This limits the freedom of the user in the same manner as described above.

One of the major reasons that existing designs have been unsuccessful in providing adequate performance in the wireless environment has been that wireless operation at high speed requires very good signal-to-noise ratios. In general, the analog devices proposed in the prior art have been unable, at least so far, to maintain an adequate signal to noise ratio across a wireless interface to maintain the overall throughput required for v.34 performance.

As a result, there has been an increasingly apparent need for a system and method which provide the same performance as land lines, but permit the computer user the freedom promised by laptop computers.

SUMMARY OF THE INVENTION

The present invention provides a system and method for maintaining a high data rate communications link between a computer system and a remotely located connection to the Public Switched Telephone Network (PSTN). In particular, the system and method of the present invention provide sufficiently reliable v.34-level wireless communications between a personal computer and a remote receiver attached to, for example, the PSTN.

To achieve the high performance required, the analog signals from the modem associated with the computer are converted to digital signals which are then transmitted digitally to a receiver, de-converted back to analog and provided to the conventional PSTN for further propagation to their eventual destination.

While the conversion of the analog modem output to a digital signal is a significant improvement over typical prior art systems, a significant part of the present invention has been the identification of various problems associated with conventional wireless communications techniques when applied to high speed wireless transmission of analog data streams. To assist in maintaining good signal-to-noise ratios and thus in achieving more reliable performance, additional steps may be taken beyond just conversion to a digital data stream. Some form of error correction would prove helpful.

In a real-time digital communications environment, feedback error correction has proved inadequate as having excessive and unpredictable latency. Instead, forward error correction has been found to have significantly better performance for transmission of analog signals both because the latency is fixed (rather than variable) and because the latency is less. Forward error correction is capable of reconstructing bitstreams in which the errors occur on a substantially random basis. However, forward error correction when used alone has been found to be of limited use in a digital wireless environment, because errors in such an environment tend to occur as bursts in which an entire sequence of data bits is lost. This results in the correction algorithm being unable to reconstruct or inaccurate when reconstructing the sequence.

To remedy the difficulty, the system and method of the present invention re-introduce an element of randomness into the errors which occur by interleaving, or re-ordering, units (e.g., bits, words, or code words) of the transmitted data stream. Thus, when burst errors occur, they affect only nonsequential units. The data stream is then de-interleaved and reassembled in its original order at the receiver side.

Although the foregoing elements provide substantially enhanced performance in a wireless environment, additional difficulties such as echo impact the high speed wireless delivery of analog data. Echo and the related issues of timing jitter and frequency offset, while present in prior art systems, take on a different form and impose significantly different concerns in the environment of the present invention. Echo involves leakage between the outgoing data stream and the incoming data stream. While this phenomenon is well known in analog modems where it can be handled through conventional echo cancellation techniques, in the present invention, the echo comes back through the wireless channel and presents much longer delays than conventional techniques can reliably handle. As a result, the present invention permits cancellation of the leakage signal before transmission. The system and method implement special echo cancellation training techniques to train the echo cancellation circuit more rapidly than with conventional analog modems, and also to train the circuit in the presence of various tone noises.

As noted above, timing jitter and frequency offset are other problems which affect performance of a wireless link connecting two analog modems. Frequency offset and timing jitter are both related to the synchronicity between the clocks associated with the A/D and D/A converters in the local and base transceivers. In an exemplary embodiment, the difficulty is overcome by use of a timing recovery technique so that looped time is used for all clocks. By this approach, synchronicity is maintained between the transceivers.

The foregoing summary of the invention may be better understood from the following detailed description and figures.

DETAILED DESCRIPTION OF THE INVENTION

Figure 1:
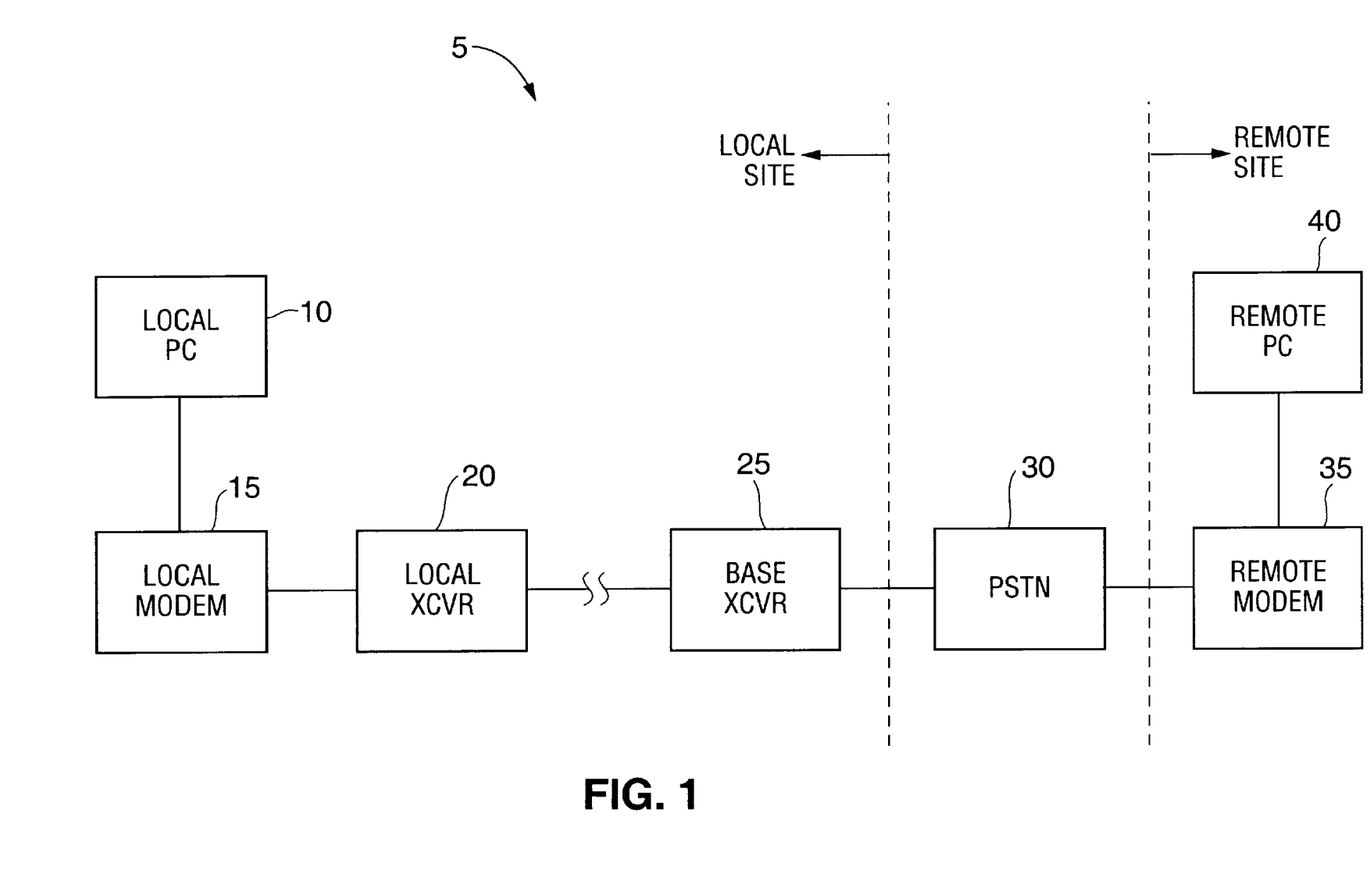
FIG. 1 is a generalized block diagram illustrating a wireless communications system in accordance with the present invention.

FIG. 1 is a block diagram generally illustrating a wireless communications system of the present invention according to a first embodiment. A local Personal Computer (PC) 10 communicates with a conventional analog local modem 15, which in turn provides an analog output to a local transceiver 20. The local transceiver 20, described in greater detail with reference to FIG. 2A, receives the data stream from the local modem 15 via a standard RJ-11 jack and, after appropriate manipulation and conversion discussed in detail hereinafter with reference to FIG. 2A, outputs a digital data stream via a direct sequence spread spectrum wireless channel to a base transceiver 25. The base transceiver 25 is connected to the PSTN 30 and ultimately to a remote modem 35 and associated remote PC 40. Similarly, the remote PC 40 may communicate data to the local PC 10, in a full-duplex mode.

The local PC 10, local modem 15 and local transceiver 20 are coupled together and travel with the user. The base transceiver 25 may be coupled to a conventional telephone network jack in the user's home or within the local area. The location of the base transceiver 25 is limited to a location which can receive the signal from the local transceiver 20. The remote modem 35 and remote PC 40 may be located anywhere in communication with the PSTN 30. It will be appreciated that the location of the remote modem 35 and the remote PC 40 are immaterial to the present invention. FIG. 1 illustrates that the components to the left of the PSTN 30 are part of a local site, and that the components to the right of the PSTN 30 are part of a remote site.

Figure 2A:
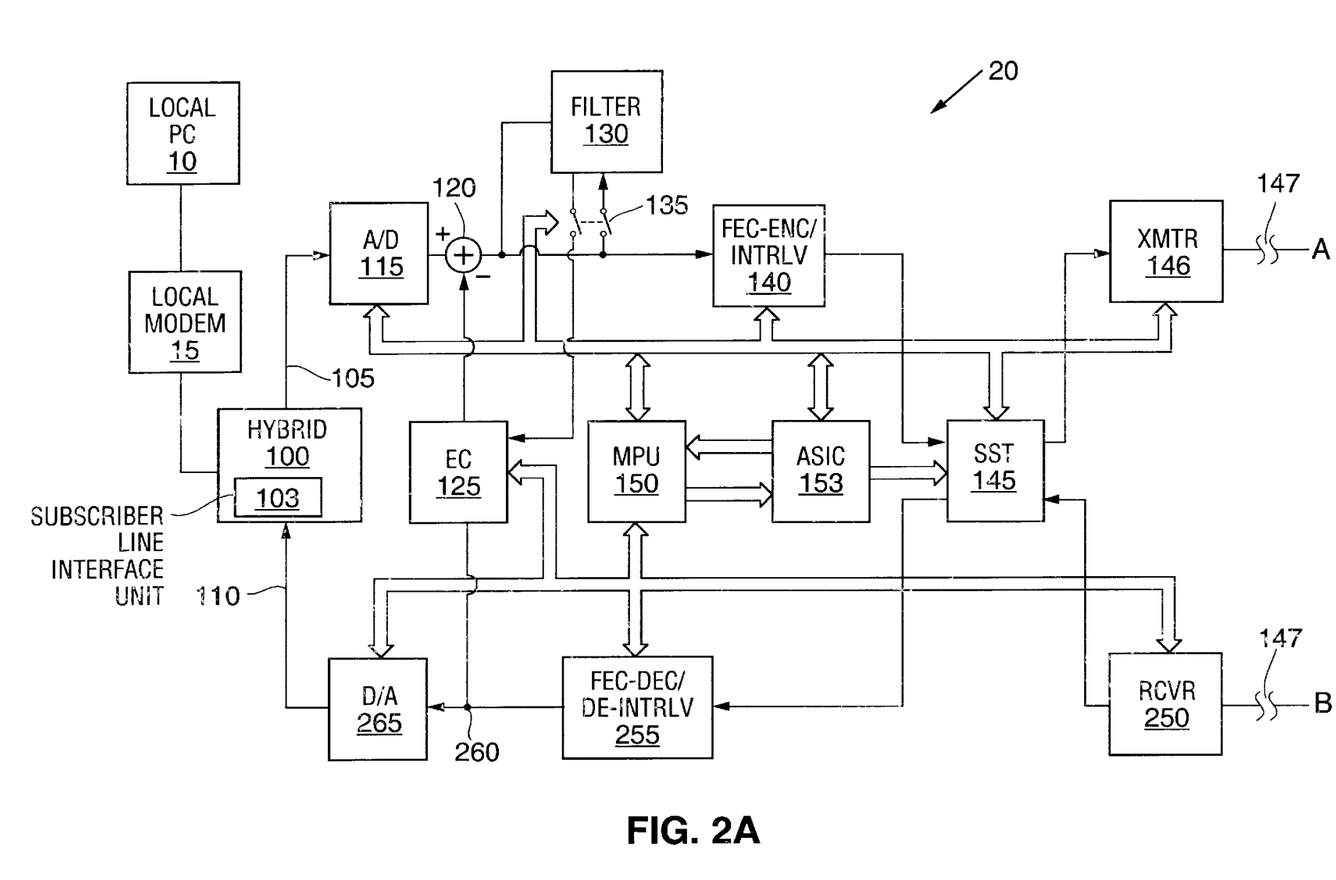
FIG. 2A is a block diagram illustrating the local transceiver of FIG. 1.
Figure 2B:
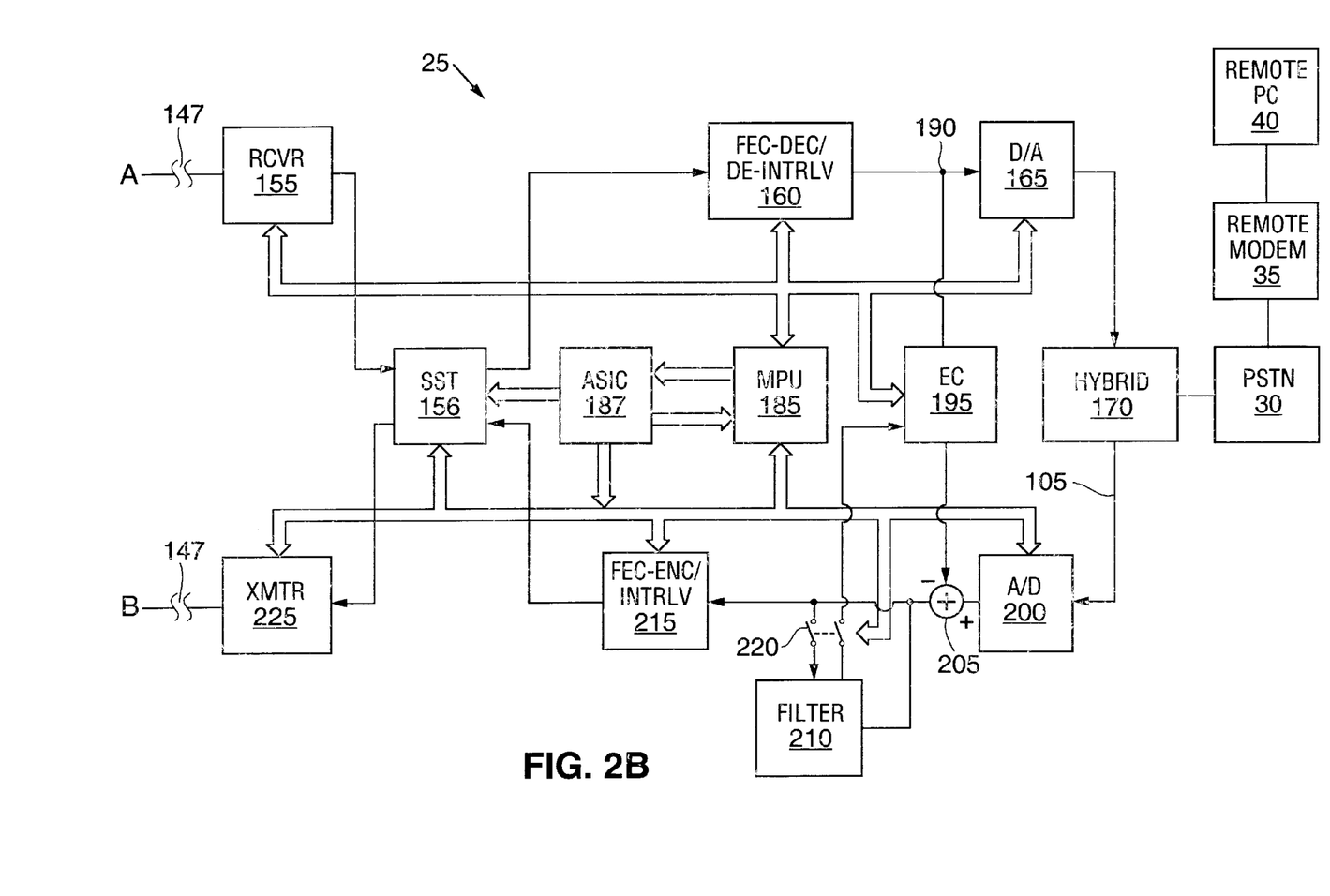
FIG. 2B is a block diagram illustrating the base transceiver of FIG. 1.

FIGS. 2A and 2B are block diagrams illustrating the structure and operation of the local and base transceivers 20 and 25. Referring to FIG. 2A, the local PC 10 and local modem 15 connect to the transceiver 20 at a hybrid circuit 100, which functions primarily to maintain the outgoing data stream 105 separate from the incoming data stream 110. The hybrid circuit 100 includes a subscriber line interface unit 103 for generating loop current and ringing voltage, so that the analog signal can be transmitted and so that the transceiver can drive the modem 15. The outgoing data stream 105 is provided to an A/D converter 115, where the analog data stream is converted into a digital data stream, typically by sampling the analog waveform at the Nyquist frequency.

The converted digital data stream is then combined at a summing junction 120 with a signal from an Echo Cancellation (EC) block 125 (discussed hereinafter). The resulting signal will be fed through a filter 130 if the switch 135 is closed, which occurs during training of the EC block 125. The resulting signal is fed directly to a Forward Error Correction (FEC) encoding and interleave block 140. The output of the block 140 is supplied to a direct sequence spread spectrum block 145, which modulates the baseband signal, for example, to 900 MHz, and which is commonly referred to as an SST chip. The SST block 145 forwards the signal to transmitter 146, which transmits it using RF modulation into the air 147.

A MicroProcessor Unit (MPU) 150, which may be either a conventional microprocessor or a digital signal processor, is provided together with an ASIC 153 to provide timing, control and various logic functions to the functions of the A/D converter 115, the EC block 125, the filter 130, the filter switch 135, FEC encoder and interleave block 140, SST circuit 145 and transmitter 146. The ASIC 153 basically serves as the agent of the SST circuit 145 and of the MPU 150 to provide required timing and control signals and in many respects may be thought of as a coprocessor.

Referring to FIG. 2B, the base transceiver 25 receives the spread spectrum data stream from the air 147 at the receiver 155. For simplicity, the link from the local transceiver 20 and the link to the base transceiver 25 are each indicated as point "A." The receiver 155 supplies the data stream to SST chip 156 for spread spectrum decoding. The stream is then decoded using an forward error correction algorithm and de-interleaved in block 160. Block 160 passes the reassembled digital data stream through D/A converter 165, and thus to hybrid circuit 170. Hybrid circuit 170 forwards the resultant analog data stream via the PSTN 30 to the receiving modem 35 and associated remote PC 40.

Similarly to the transmitting portion of the local transceiver 20 discussed above with reference to FIG. 2A, a MicroProcessor Unit (MPU) 185 and an ASIC 187 provide timing and control signals to the receiver 155, SST circuit 156, de-interleave block 160 and D/A converter 165. In addition, an EC block 195 receives echo canceling data from a node 190 located between the FEC decoder and de-interleave block 160 and the D/A converter 165, also under control of MPU 185. The operation of the EC block 195 will be discussed in greater detail hereinafter.

Referring still to FIG. 2B, the base transceiver 25 includes a transmitting portion which is almost identical to that described above for local transceiver 20. Outgoing data from the remote PC 40 and modem 35 is supplied to hybrid circuit 170, which maintains separation of the incoming and outgoing data streams. The A/D converter 200 converts the analog data stream to a digital data stream. The digital data stream is summed at junction 205 with the signal from the echo cancellation block 195. The resulting data stream is supplied to a filter 210 if a switch 220 is closed, and then to FEC encoder and interleave block 215. The filter is inserted into the circuit 25 during training of the EC circuit 195, and basically functions to compensate for system noise during training as will be discussed hereinafter. Finally, the SST circuit 156 processes the data stream from the FEC encoder and interleave block 215. The transmitter 225 then transmits the processed stream via air 147 to local transceiver 20. For simplicity, the link from the base transceiver 25 and the link to the local transceiver 20 are each indicated as point "B."

Referring again to FIG. 2A, the data stream received at local transceiver 20, essentially at point B, is first processed by receiver 250. Receiver 250 supplies the received information to the SST chip 145 for spread spectrum decoding. The decoded data stream is then provided to FEC-decoding and de-interleaving block 255. The output of the block 255 is a decoded and reassembled data stream, and is supplied first to the EC block 125 via a node 260, and second to the D/A converter 265. Finally, the now analog data stream is supplied to the hybrid circuit 100 via link 110, and then to modem 15 and PC 10.

Although the EC blocks 125 and 195, the FEC-encoding and interleaving blocks 140 and 215, the FEC-decoding and de-interleaving blocks 160 and 255, and the filters 130 and 210 shown in FIGS. 2A and 2B are illustrated as separate components of the respective transceivers 20 and 25, in general these functions will be provided by the associated MPU (or DSP) 150 and 185. For example, MPU 150 will typically perform all of the functions of EC block 125, filter 130, FEC encoder and interleave block 140, and FEC decoder and de-interleave block 255. Although some or all of such blocks could be constructed separately, these blocks have been shown here primarily for purposes of clarity.

Referring to EC block 125 and associated filter 130, shown in FIG. 2A, the issues of echo cancellation may be better understood by the following discussion. As shown in FIG. 2A, the hybrid circuit 100 of the local transceiver 20 maintains a separation between incoming and outgoing data streams. However, due to mismatch with the electric line characteristics, some of the incoming data stream often leaks through the hybrid circuit 100 and into the outgoing data stream. This problem also occurs at hybrid circuit 170 of base transceiver 25, shown in FIG. 2B.

The problem of echo cancellation in the local and base transceivers 20 and 25 of the present invention presents some unique problems, quite different from those encountered with conventional modems. In conventional modems operating under ITU-T v.34 standards, a relatively long quiet period is provided for training of the EC circuits 20 and 25. However, these luxuries do not exist in the context of the present invention. Referring to FIG. 2A, the timing requirements of the modem 15 require that the dial tone be successfully supplied to the modem 15 very quickly (e.g., within 1 second). Thus, the present invention must accomplish training in the presence of a dial tone very quickly. To accomplish this, the echo cancellation block 125 subtracts any leakage from signals incoming on line 110. Examples of available echo cancellation techniques include Finite Impulse Response (FIR) and Infinite Impulse Response (IIR) techniques. Additionally, the filter 130 is switched into the circuit during training mode by means of switch 135 to filter out both the dial tone and any other noise (e.g., harmonics from the power line).

Once training is complete, the MPU 150 opens switch 135 and the filter 130 is removed so that normal operation can proceed. Similar training is performed for leakage in base transceiver 25. It will be appreciated by those skilled in the art that the filter 130 could instead be constructed as a pair of filters, the first between the A/D converter 115 and the summing junction 120, and the second between the EC block 125 and the summing junction 120. Additional training can be implemented to cancel modem noises.

The environment of the present invention also imposes concerns regarding the operation of forward error correction and interleaving. Forward error correction is used instead of feedback error correction, which is typically used in such environments. Although feedback error correction offers very low bit error rates, feedback error correction is generally inadequate in the present environment because of its variable and long latency. Although forward error correction usually will not offer bit error rates as low as feedback error correction, forward error correction offers the benefit of fixed and shorter latency. In particular, Reed-Solomon forward error correction has been implemented with success, although other forms of forward error correction may also be acceptable.

Although forward error correction offers significant improvements over the prior art, forward error correction is better capable of overcoming random errors than burst errors. Thus, the system and method of the present invention implement interleaving. Interleaving and de-interleaving as implemented in the present invention will be appreciated greatly from FIGS. 3A and 3B.

Figure 3A:
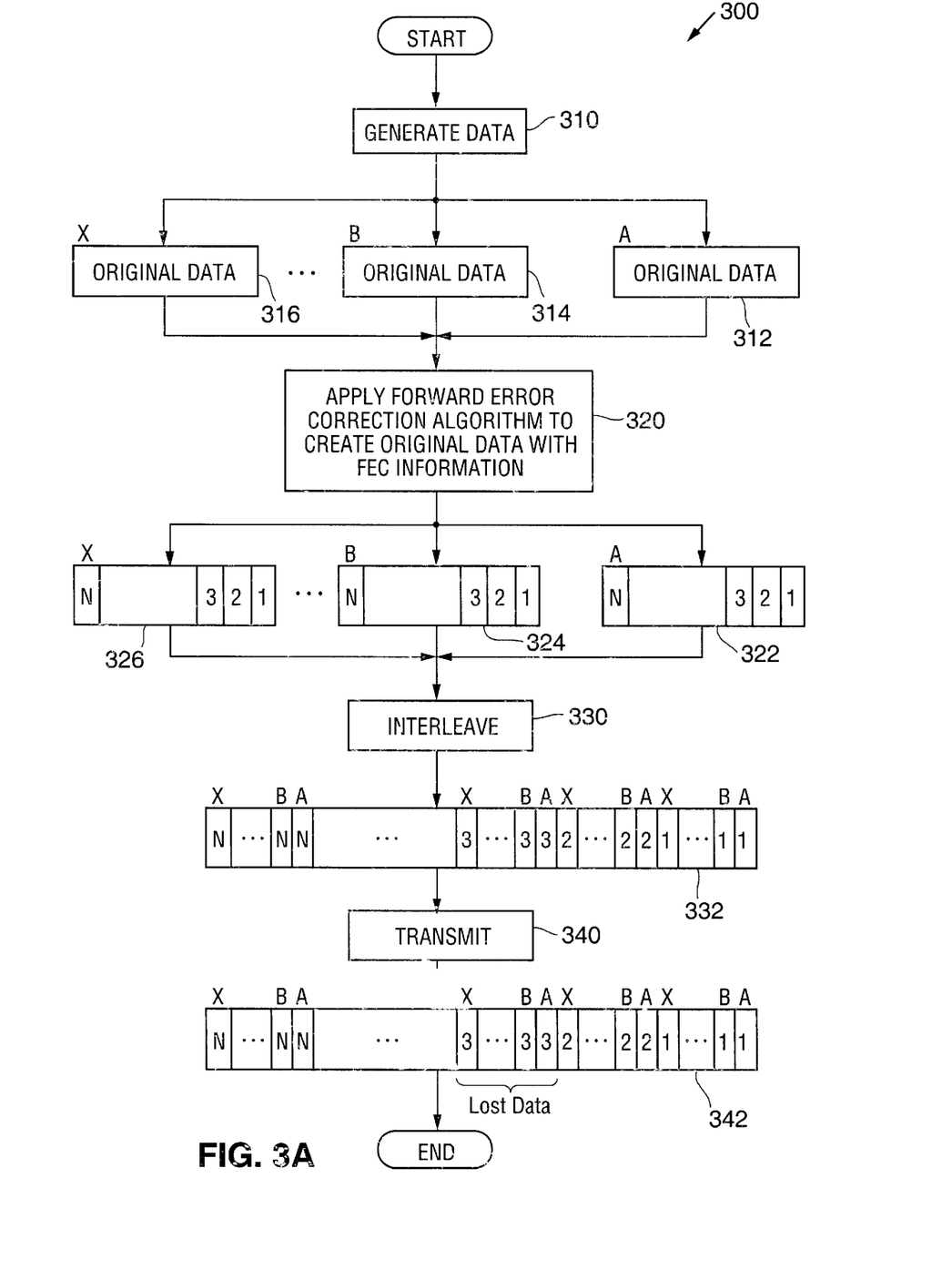
FIG. 3A is a flowchart illustrating a method of transmitting data from a first transceiver across a wireless channel to a second transceiver.

FIG. 3A is a flowchart illustrating an example method 300 of transmitting a data stream from a local PC 10 across a wireless channel to a base transceiver 25. Method 300 begins with the local PC 10 in step 310 generating data for transmission to the remote PC 40. The data packets generated by the local PC 10 are shown as original data 312, 314 and 316, but are more conveniently designated data packets A, B through X. It will be appreciated that each of the data packets A, B through X preferably includes an equal number of bits. It will also be appreciated that a maximum number of packets can be managed by the system and method described herein. The maximum number is based on the speed needed by the system to operate in real time without introducing unwanted latency.

The FEC encoder 140 of the local transceiver 20 in step 320 applies a forward error correction encoder algorithm, such as Reed-Solomon, to generate original data with FEC information, respectively labeled as data packet 322, 324 and 326. Data packets 322, 324 and 326 were generated respectively from original data 312, 314 and 316. Each of data packets 322, 324 and 326 include an equal number of N sequential units (e.g., bits, words, or code words). Each of data packets 322, 324 and 326 are conveniently labeled as A, B through X to indicate data packet origin.

The interleave block 140 of the local transceiver in step 330 interleaves the data packets 322, 324 and 326 together, so that the data units are grouped together based on like position in the data packet. For example, the first data units of each packet are grouped together to form the lowest order units of the resulting single data packet, the second data units of each packet are grouped together to form the next lowest order units of the resulting single data packet, etc. An example resulting single data packet is illustrated as data packet 332, and may be referred to as "frame" 332. It will be appreciated that other interleaving algorithms can alternatively be used. Since the data packets are interleaved together, a burst error has less chance of affecting sequential bits in a single data packet.

The transmitter 146 of the local transceiver 20 in step 340 transmits the resulting single data packet 332 to the receiver 155 (FIG. 2B) of the base transceiver 25, possibly with data corruption. An example of a single data packet received with data corruption is illustrated as data packet 342. As shown, a burst of X-units were corrupted, namely, all of the third lowest order units of each of the data packets 322, 324 and 326. Accordingly, no sequential units from a single packet were corrupted. So long as less than a burst of X-units is corrupted, no sequential units from a single packet will be corrupted. It will be appreciated that, although a group of equal order units were corrupted, any burst of less than X-units will result in no sequential units from a single data packet being corrupted. The greater the number of packets interleaved together, the greater the protection from burst errors. Method 300 then ends.

Figure 3B:
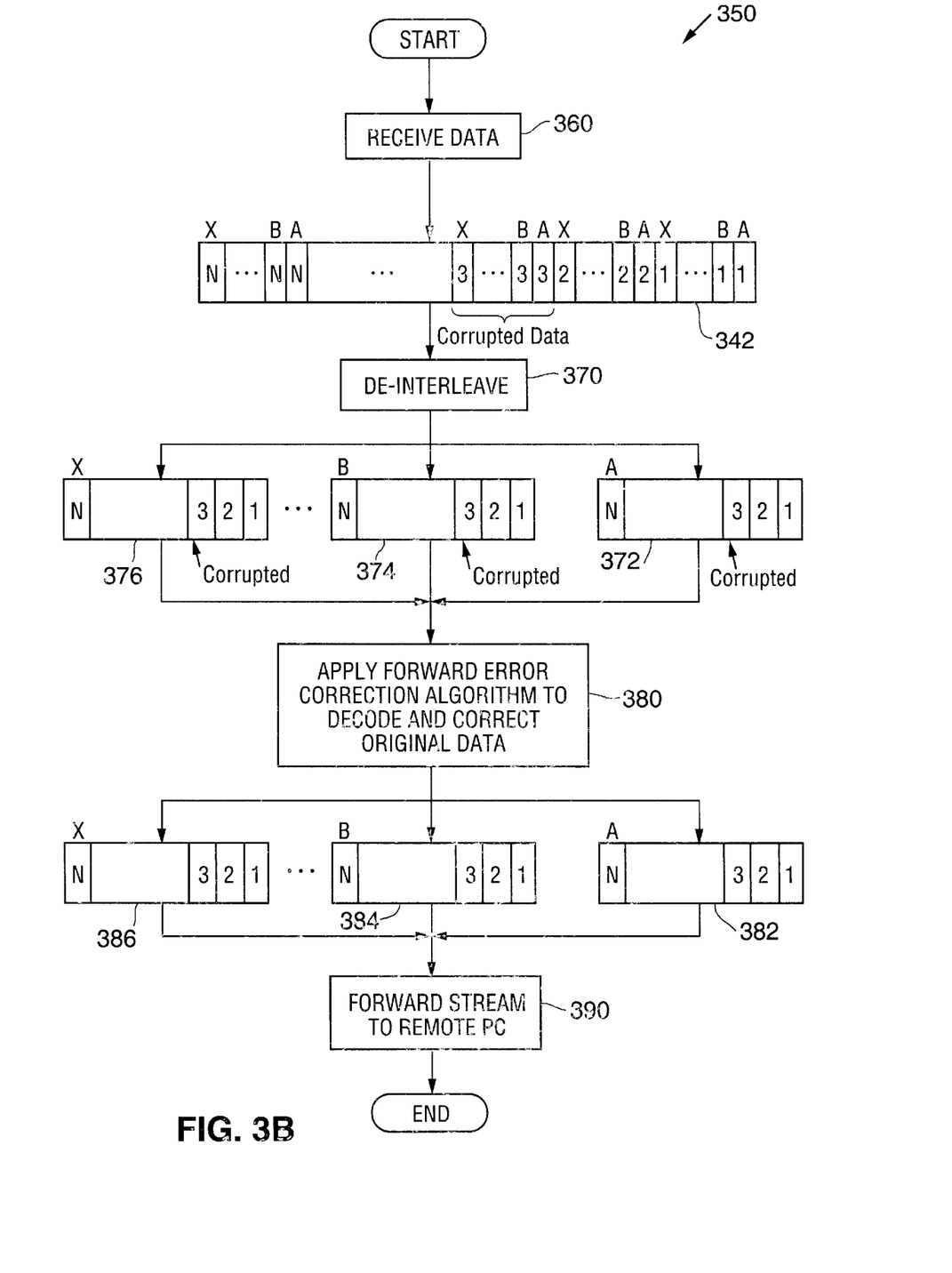
FIG. 3B is a flowchart illustrating a method of receiving data from the first transceiver by the second transceiver.

FIG. 3B is a flowchart illustrating an example method 350 of receiving a data stream from a local transceiver 20 by a base transceiver 25 and transmitting the data stream to a remote PC 40. Method 350 begins (where method 300 left off) with the receiver 155 of the base transceiver 25 in step 360 receiving a single data packet, illustrated as data packet 342 (which is the same data packet 342 with a burst error loss shown in FIG. 3A). The de-interleave block 160 of base transceiver 25 in step 370 de-interleaves the single data packet 342 to generate X-number of data packets 372, 374 and 376. Accordingly, the de-interleave block 160 must know, be informed of, or learn the number of interleaved packets. Data packets 372, 374 and 376 are labeled A, B through X to indicate data packet origin. Each of the data packets 372, 374 and 376 includes, as an example, one unit corrupted during the transmission.

The FEC decoder 160 of base transceiver 25 in step 380 applies the forward error correction decoder algorithm, such as Reed-Solomon, to decode the encoded data packets 372, 374 and 376, and thus to determine the value of the corrupted unit in each of the packets. The resulting data packets are illustrated as decoded data packets 382, 384 and 386, also labeled as A, B through X to indicate origin. The hybrid circuit 170 of the base transceiver 25 in step 390 forwards the data packets 382, 384 and 386 via the PSTN 30 and the remote modem 35 to the remote PC 40. Method 350 then ends.

Figure 4:
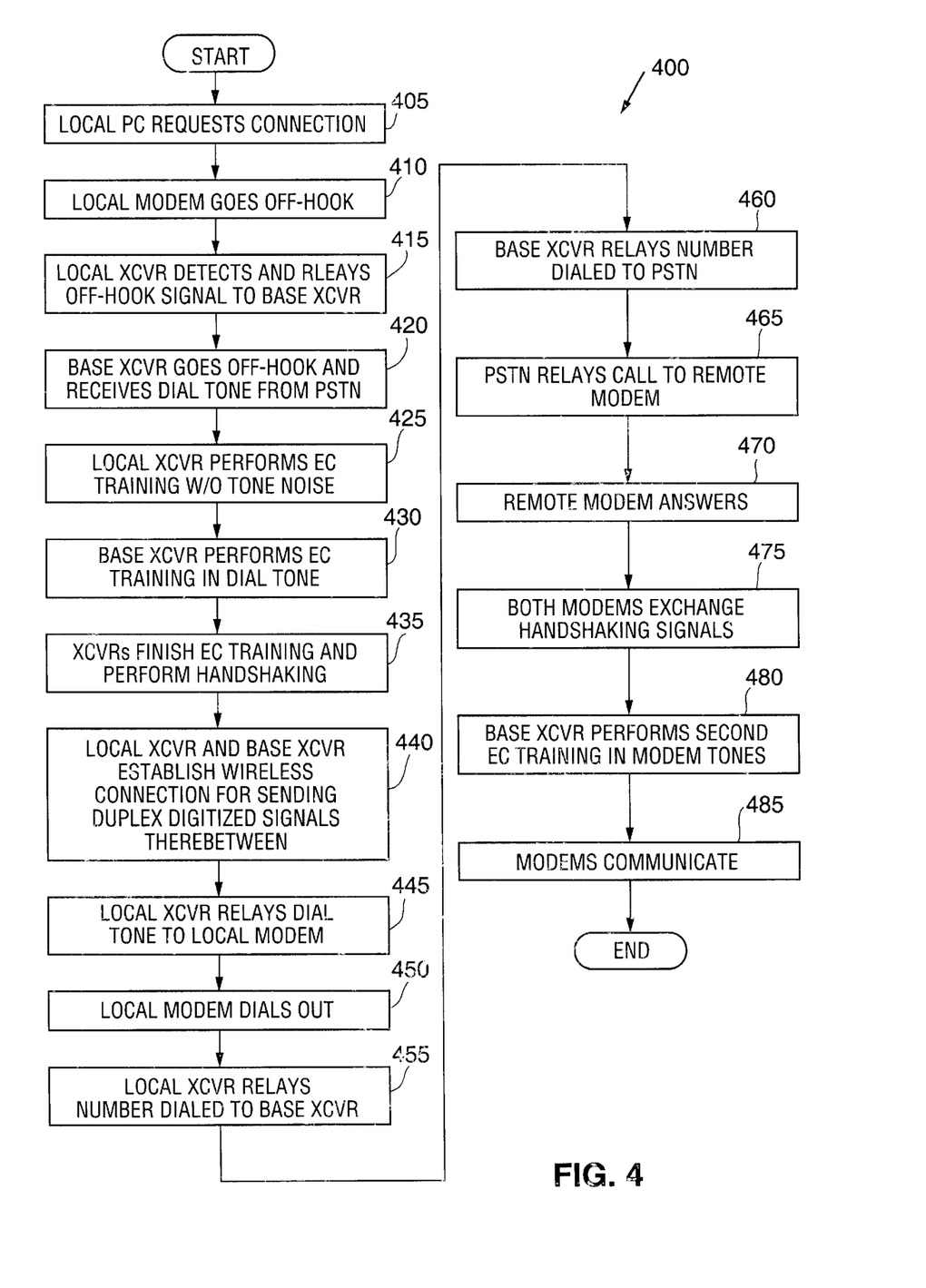
FIG. 4 is a flowchart illustrating a method of connecting two modems across a wireless channel to enable an outgoing call.

FIG. 4 is a flowchart illustrating a method 400 of connecting two modems across a wireless channel to enable an outgoing call. Method 400 begins with the local PC 10 in step 405 requesting a connection to the remote PC 40. The local modem 15 in step 410 goes off-hook. The local transceiver 20 in step 415 detects and relays the off-hook signal from the local modem 15 to the base transceiver 25.

The base transceiver 25 in step 420 goes off-hook and receives dial tone from the PSTN 30. The local transceiver 20 in step 425 performs echo cancellation training without tone noise. Steps 425 and 430 are preferably performed in parallel to achieve a shorter training time. The base transceiver 25 in step 430 performs echo cancellation training in dial tone. Both transceivers 20 and 25 in step 435 finish echo cancellation training and perform handshaking, and in step 440 establish a wireless connection for sending duplex digitized signals therebetween.

The local transceiver 20 in step 445 relays dial tone to the local modem 15, which in step 450 dials out. The local transceiver 20 in step 455 relays the number dialed by the local modem 15 to the base transceiver 25. The base transceiver 25 in step 460 relays the number to the PSTN 30, which in step 465 relays the call to the remote modem 35. The remote modem 35 in step 470 answers. Both modems 15 and 35 in step 475 exchange handshaking signals. The base transceiver 25 in step 480 performs a second echo cancellation training in modem tones. Both modems 15 and 35 in step 485 communicate. Method 400 then ends.

Figure 5:
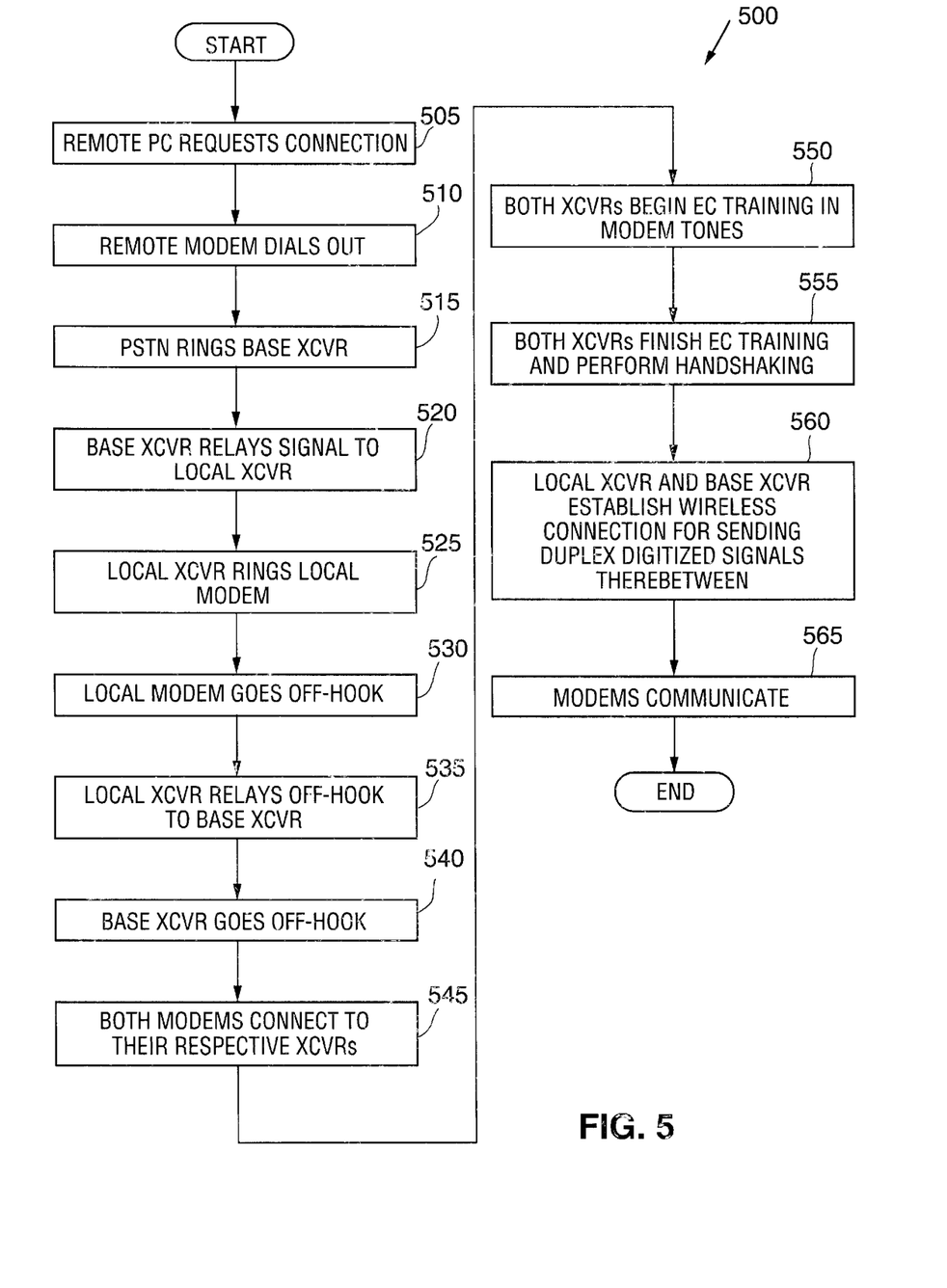
FIG. 5 is a flowchart illustrating a method of connecting two modems across a wireless channel to enable an incoming call.

FIG. 5 is a flowchart illustrating a method 500 of connecting two modems across a wireless channel to enable an incoming call. Method 500 begins with the remote PC 40 in step 505 requesting a connection to the local PC 10. The remote modem 35 in step 510 dials out. The PSTN 30 in step 515 rings the base transceiver 25, which in step 520 relays the signal to the local transceiver 20. The local transceiver 20 in step 525 rings the local modem 15, which in step 530 goes off-hook. The local transceiver 20 in step 535 relays the off-hook signal to the base transceiver 25, which in step 540 also goes off-hook thereby answering the call.

Both modems 15 and 35 in step 545 connect to their respective transceivers, namely, modem 15 connects to transceiver 20 and modem 35 connects to transceiver 25. Both transceivers 20 and 25 in step 550 begin echo cancellation training in modem tones. In step 555, both transceivers 20 and 25 finish echo cancellation training and perform handshaking. Both transceivers 20 and 25 in step 560 establish a wireless connection for sending duplex digitized signals therebetween. Modems 15 and 35 in step 565 communicate. Method 500 then ends.

A still further element of the present invention is the use of frame timing to avoid frequency offset and timing jitter. Essentially, the performance requirements of v.34 are difficult to meet even with the features discussed above if frequency offsets exist between the AND and D/A converters resident in the transmitter and receiver sides, respectively, or if the local clocks associated with those AID and D/A converters are not synchronous.

Figure 6A:
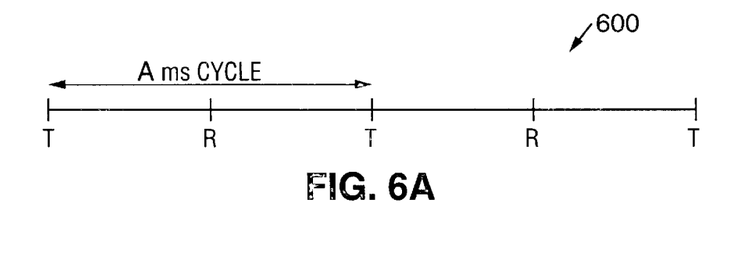
FIG. 6A is a timing diagram illustrating a master clock.

FIG. 6A illustrates a timing diagram 600 of the master clock (not shown), which can be either the clock on the local XCVR 20 or the clock on the base transceiver 25. The master clock operates such that, every A milliseconds (according to the master's local clock), the "master" transceiver (i.e., the transceiver with the master clock) can transmit a frame. Likewise, every A/2 milliseconds, the master transceiver can transmit or receive a frame. In FIG. 6A, frame transmissions are labeled "T" and frame receipts are labeled "R." By alternating transmission and receipt of frames, the local and base XCVRs 20 and 25 can achieve full duplex signal communication. The cycle time of A milliseconds is known by the "slave" transceiver (i.e., the transceiver having the slave clock).

Figure 6B:
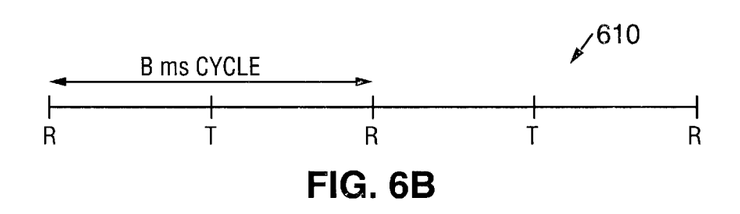
FIG. 6B is a timing diagram illustrating a slave clock.

FIG. 6B illustrates a timing diagram 610 of the slave clock (not shown). The slave clock operates such that, every B milliseconds (according to the slave's local clock), the slave transceiver receives a frame. Like in FIG. 6A, frame receipts are labeled "R" and frame transmissions are labeled "T." Based on the known cycle time A and the determinable cycle time B, the slave transceiver can adjust its clock to match the master clock of the master transceiver.

Figure 6C:
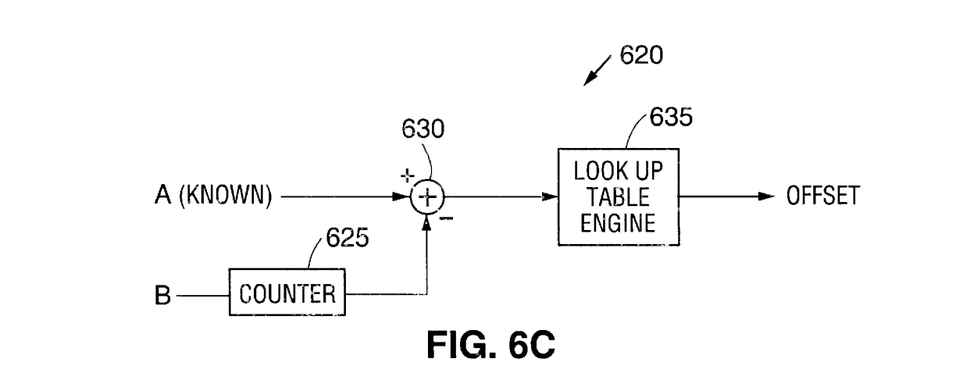
FIG. 6C is a block diagram illustrating an open loop clock offset adjustment circuit.

FIG. 6C is a block diagram illustrating an open loop clock offset adjustment circuit 620 for adjusting the large swing of the slave clock. Preferably off-line during setup, a counter 625 reviews the slave clock to compute the cycle time B' between receiving frames from the master transceiver. A summation node 630 determines the difference between the known master clock cycle time A' and the computed cycle time B', and forwards the difference to a lookup table engine 635, which looks up a closest available offset value for modifying the slave clock. For example, if it is known that the master clock sends a packet every forty milliseconds and the counter 625 determines that the slave clock reads receiving a packet every thirty milliseconds, the summation node 630 will determine that the difference between the master and slave clocks is ten milliseconds. The lookup table engine 635 searches a lookup table to determine the closest available offset of, for example, eight milliseconds, to modify the slave clock speed. The offset is sent to the timing clock adjuster 655 of FIG. 6D for slave clock adjustment.

Figure 6D:
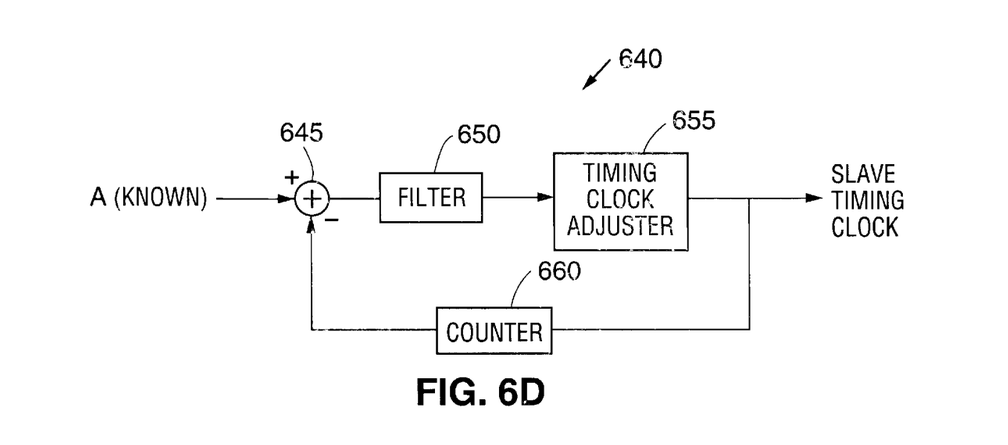
FIG. 6D is a block diagram illustrating a closed loop clock offset adjustment circuit.

FIG. 6D is a block diagram illustrating an on-line slave clock adjustment circuit 640 for adjusting small variations of the slave clock. The known master cycle time A is sent to a summation node 645. A counter 660 computes the slave clock cycle time (the time intervals between packets received from the master transceiver) and forwards the slave clock cycle time B to the summation node 645. The summation node 645 subtracts the computed slave clock cycle time B from the known master cycle time A to compute the difference. The difference is forwarded to a filter 650, which removes steady state error and makes a tradeoff among stability, jitter and responsiveness. The filter 650 forwards the difference to a timing clock adjustment circuit 655, which adjusts the slave clock speed by adding the offset computed by the off-line circuit 620 and any variance computed by the on-line circuitry 640. The timing clock adjustment circuit 655 outputs the adjusted slave clock signal.

From the foregoing description, it can be appreciated that the present invention provides a method and apparatus capable of providing vastly improved performance—including meeting ITU-T v.34 standards—in allowing modem-connected PC's to connect to the PSTN over a wireless link. To accomplish this performance, the present invention includes a variety of key elements, including using forward error correction with interleaving to maintain a low bit error rate with a high signal-to-noise ratio. In addition, adaptive echo canceling techniques combined with filtering during training are used to maintain high signal quality. Finally, timing recovery techniques and frame timing are used to ensure a single synchronous clock among the A/D and D/A converters and the SST chips between the local and base transceivers.

The foregoing description of the preferred embodiments of the present invention is by way of example only, and other variations and modifications of the above-described embodiments and methods are possible in light of the foregoing teaching. For example, although the master and slave clocks have been described in time units of milliseconds, any time unit can be used. Although the sites are being described herein as separate and distinct sites, one skilled in the art will recognize that these sites may be a part of an integral site, may each include portions of multiple sites, or may include combinations of single and multiple sites. Further, components of this invention may be implemented using a programmed general purpose digital computer, using application specific integrated circuits, or using a network of interconnected conventional components and circuits. The embodiments described herein are not intended to be exhaustive or limiting. The present invention is limited only by the following claims.

What is claimed is:

1. A method of establishing a wireless communication channel, comprising the steps of:

receiving a first connection request from a modem by a local transceiver;

transmitting a second connection request responsive to the first connection request across a wireless communications channel to a base transceiver by the local transceiver;

transmitting a third request responsive to the second connection request to a telephone network by the base transceiver;

performing a first echo cancellation algorithm without tone noise by the local transceiver;

receiving dial tone responsive to the third connection request from the telephone network by the base transceiver;

performing a second echo cancellation algorithm in dial tone by the base transceiver; and establishing a wireless channel for transmitting duplex digitized signals between the local transceiver and the base transceiver.

2. A method of establishing a wireless communications channel, comprising the steps of:

receiving a first connection request from a telephone network by a base transceiver;

transmitting a second connection request across a wireless communications channel to a local transceiver by the base transceiver;

transmitting a third connection request to a modem by the local transceiver;

receiving a first answer request from the modem by the local transceiver;

transmitting a second answer request to the base transceiver by the local transceiver;

establishing a communications channel with the telephone network by the base transceiver;

performing a first echo cancellation algorithm in modem tone by the local transceiver;

performing a second echo cancellation algorithm in modem tone by the base transceiver; and establishing a wireless channel for transmitting duplex digitized signals between the local transceiver and the base transceiver.

3. A system for establishing a wireless communication channel, comprising:

means for receiving a first connection request from a modem by a local transceiver;

means for transmitting a second communication request responsive to the first communication request across a wireless communications channel to a base transceiver by the local transceiver;

means for transmitting a third request responsive to the second connection request to a telephone network by the base transceiver;

means for performing a first echo cancellation algorithm without tone noise by the local transceiver;

means for receiving dial tone responsive to the third connection request from the telephone network by the base transceiver;

means for performing a second echo cancellation algorithm in dial tone by the base transceiver; and means for establishing a wireless channel for transmitting duplex digitized signals between the local transceiver and the base transceiver.

4. A system for establishing a wireless communication channel, comprising:

means for receiving a first connection request from a telephone network by a base transceiver;

means for transmitting a second connection request across a wireless communications channel to a local transceiver by the base transceiver;

means for transmitting a third connection request to a modem by the local transceiver;

means for receiving a first answer request from the modem by the local transceiver;

means for transmitting a second answer request to the base transceiver by the local transceiver;

means for establishing a communications channel with the telephone network by the base receiver;

means for performing a first echo cancellation algorithm in modem tone by the local transceiver;

means for performing a second echo cancellation algorithm in modem tone by the base transceiver; and means for establishing a wireless channel for transmitting duplex digitized signals between the local transceiver and the base transceiver.

5. The method of claim 1, further comprising the step of performing a third echo cancellation algorithm by the base transceiver in modem tone.

6. The system of claim 2, wherein the means for performing the second echo cancellation algorithm in dial tone by the base transceiver performs a third echo cancellation algorithm in modem tone.

7. A method for wireless communication between a personal computer and a telephone network, comprising the steps of:

transmitting a connection request from a first wireless transceiver to a second wireless transceiver in response to a wireless channel initiation request from a modem coupled to the personal computer; thereafter initiating a second connection request to the telephone network from the second transceiver to acquire a dial tone signal from the telephone network;

executing a first echo cancellation procedure at said first transceiver in the absence of the dial tone signal at said first transceiver;

executing a second echo cancellation procedure at the second transceiver after acquisition of the dial tone; and thereafter establishing a wireless communication channel between the first and second transceivers to provide for communication between the personal computer and the telephone network.

8. The method of claim 7, further comprising the step of performing a third echo cancellation procedure at the second transceiver in modem tone after a remote modem sends a tone over the telephone network.

9. The method of claim 7, further comprising the steps of:

transmitting a first data packet and a second data packet from the personal computer to the first transceiver;

encoding the first data packet and the second data packet using a forward error correction procedure to generate a first encoded data packet and a second encoded data packet;

interleaving the first encoded data packet and the second encoded data packet, thereby forming an interleaved data packet; and transmitting the interleaved data packet to the second transceiver.

10. The method of claim 7, further comprising the steps of:

transmitting data packets from the first transceiver to the second transceiver at a master time interval;

receiving data packets from the first transceiver by the second transceiver at a computed time interval;

determining a difference between the master time interval and the computed time interval; and modifying a speed of a slave clock according to the difference.

11. The method of claim 9, further comprising the steps of:

receiving the interleaved data packet;

de-interleaving the interleaved data packet to substantially reconstruct the first encoded data packet and the second encoded data packet; and decoding the reconstructed data packets.

12. A method for wireless communication between a first transceiver and a second transceiver, comprising the steps of:

executing a first echo cancellation procedure at the first transceiver in the absence of a dial tone signal; and executing a second echo cancellation procedure at the second transceiver after acquisition of a dial tone from a telephone network.

13. The method of claim 12, further comprising the step of performing a third echo cancellation procedure at the second transceiver in modem tone after a remote modem sends a tone over the telephone network.

14. An apparatus for wireless communication between a personal computer and a telephone network, the apparatus comprising:

first transmitting means for transmitting a connection request from a first wireless transceiver to a second wireless transceiver in response to a wireless channel initiation request from a modem coupled to the personal computer;

means for initiating a second connection request to the telephone network from the second transceiver to acquire a dial tone signal from the telephone network;

means for executing a first echo cancellation procedure at said first transceiver in the absence of the dial tone signal at said first transceiver;

means for executing a second echo cancellation procedure at the second transceiver after acquisition of the dial tone; and means for establishing a wireless communication channel between the first and second transceivers to provide for communication between the personal computer and the telephone network.

15. The apparatus of claim 14, wherein the means for executing the second echo cancellation procedure executes a third echo cancellation procedure after acquisition of a modem tone from a remote modem over the telephone network.

16. The apparatus of claim 14, further comprising:

second transmitting means for transmitting a first data packet and a second data packet from the personal computer to the first transceiver;

means for encoding the first data packet and the second data packet using a forward error correction procedure to generate a first encoded data packet and a second encoded data packet; and means for interleaving the first encoded data packet and the second encoded data packet, thereby forming an interleaved data packet, wherein the first transmitting means transmits the interleaved data packet to the second transceiver.

17. The apparatus of claim 16, further comprising:

control means for transmitting data packets from the first transceiver to the second transceiver at a master time interval;

means for computing a time interval between data packets received by the second transceiver;

means for determining a difference between the master time interval and the computed time interval; and means for modifying a speed of a slave clock according to the difference.

18. The apparatus of claim 16, wherein the second transceiver further comprises:

means for receiving the interleaved data packet;

means for de-interleaving the interleaved data packet to substantially reconstruct the first encoded data packet and the second encoded data packet; and means for decoding the reconstructed data packets.

19. An apparatus for wireless communication between a first transceiver and a second transceiver, comprising:

means for executing a first echo cancellation procedure at the first transceiver in the absence of a dial tone signal; and means for executing a second echo cancellation procedure at the second transceiver after acquisition of a dial tone from a telephone network.

20. The apparatus of claim 19, wherein the means for executing the second echo cancellation procedure executes a third echo cancellation procedure after acquisition of a modem tone from a remote modem over the telephone network.

21. An apparatus comprising a first transceiver and a second transceiver for establishing a wireless communication channel and for encoding and transmitting data packets, the first transceiver comprising:

a first hybrid circuit for receiving a first connection request from a modem and for receiving a plurality of data packets from a computer;

a transmitter for transmitting a second connection request across a wireless communications channel to a second transceiver; and a first echo cancellation circuit for performing a first echo cancellation training procedure without dial tone noise;

and the second transceiver comprising:

a receiver for receiving the second connection request from the first transceiver;

a second hybrid circuit for transmitting a third connection request responsive to the second connection request to a telephone network and for receiving a dial tone from the telephone network; and a second echo cancellation circuit for performing a second echo cancellation process in dial tone.

22. The apparatus of claim 21, wherein the second echo cancellation circuit performs a third echo cancellation process in modem tone after acquisition of a modem tone from a remote modem over the telephone network.

23. The apparatus of claim 21, wherein the first transceiver further comprises:

a forward error correction encoding circuit for encoding the plurality of data packets, thereby generating a plurality of encoded data packets; and an interleaving circuit for interleaving the plurality of encoded data packets to generate an interleaved encoded data packet, wherein the transmitter transmits the interleaved encoded data packet across the wireless channel to the second transceiver.

24. The apparatus of claim 21, wherein the first transceiver further comprises a master clock which causes the transmitter to transmit data packets to the second transceiver at a master time interval.

25. The apparatus of claim 23, wherein the second transceiver receives the interleaved encoded data packet from the first transceiver and the second transceiver further comprises:

a de-interleaving circuit for de-interleaving the interleaved encoded data packet, thereby generating a plurality of encoded data packets; and a decoding circuit for decoding the plurality of encoded data packets.

26. The apparatus of claim 24, wherein the second transceiver further comprises:

a counter for computing a time interval between data packets received by the second transceiver;

a summation node for determining a difference between the master time interval and the computed time interval; and a slave clock adjustment circuit for modifying a speed of the slave clock according to the difference.

27. An apparatus for wireless communication between a first transceiver and a second transceiver, comprising:

a first echo cancellation circuit for executing a first echo cancellation procedure at the first transceiver in the absence of a dial tone signal; and a second echo cancellation circuit for executing a second echo cancellation procedure at the second transceiver after acquisition of a dial tone from a telephone network.

28. The apparatus of claim 27, wherein the second echo cancellation circuit performs a third echo cancellation process in modem tone after acquisition of a modem tone from a remote modem over the telephone network.

* * * * *